United States Patent
Fukumoto

[19]

[11] Patent Number: 6,127,031
[45] Date of Patent: Oct. 3, 2000

[54] RUBBER COMPOSITION AND ELASTIC ROLLER USING RUBBER COMPOSITION

[75] Inventor: Takahiro Fukumoto, Hyogo, Japan

[73] Assignee: Sumitomo Rubber Industries, Ltd., Tokyo, Japan

[21] Appl. No.: 09/052,115

[22] Filed: Mar. 31, 1998

[30] Foreign Application Priority Data

Apr. 7, 1997 [JP] Japan ................................... 9-088048

[51] Int. Cl.$^7$ ....................................................... B32B 5/16
[52] U.S. Cl. ......................... 428/323; 428/340; 428/375; 399/174; 399/176; 399/269; 399/279
[58] Field of Search ................... 355/277, 271, 355/282, 296, 215, 295, 301; 428/323, 375, 340, 327; 399/174, 176, 313, 282, 279, 265

[56] References Cited

U.S. PATENT DOCUMENTS

| | | | |
|---|---|---|---|
| 5,070,366 | 12/1991 | Tsuchiya .................................. | 355/219 |
| 5,363,176 | 11/1994 | Ishihara et al. ......................... | 355/219 |
| 5,432,590 | 7/1995 | Nomura et al. ......................... | 355/200 |
| 5,565,968 | 10/1996 | Sawa et al. .............................. | 355/259 |
| 5,766,753 | 6/1998 | Murata et al. ........................... | 428/323 |
| 5,819,142 | 10/1998 | Murata et al. ........................... | 399/176 |
| 5,878,313 | 3/1999 | Takegi et al. ............................ | 399/279 |

*Primary Examiner*—Merrick Dixon
*Attorney, Agent, or Firm*—Kanesaka & Takeuhi

[57] ABSTRACT

A material is molded in the shape of a roller and then the molded material is vulcanized to manufacture an elastic roller. The material consists of 100 parts by weight of EPDM polymer (E505 (trade name) manufactured by Sumitomo Kagaku Co., Ltd.), 10 parts by weight of silica which is used as filler (NipsilVN3 (trade name) manufactured by Nippon Silica Co., Ltd.), 30 parts by weight of paraffin oil (PW-909 (trade name) manufactured by Idemitsu Kosan Co., Ltd.), one part by weight of stearic acid, five parts by weight of zinc oxide, two parts by weight of sulfur (manufactured by Tsurumi Kagaku Co., Ltd.), one part by weight of vulcanizing accelerator (mercaptobenzothiazole and Noxceller-M (trade name) manufactured by Ouchishinko Kagaku Co., Ltd.), 0.5 parts by weight of vulcanizing accelerator (tetraethylthiuram disulfide and Noxceller-TET (trade name) manufactured by Ouchishinko Kagaku Co., Ltd.), one part by weight of vulcanizing accelerator (zinc dibutyldithiocarbamate and Noxceller-BZ (trade name) manufactured by Ouchishinko Kagaku Co., Ltd.).

10 Claims, 3 Drawing Sheets

RUBBER COMPOSITION AND ELASTIC ROLLER USING RUBBER COMPOSITION

FIELD OF THE INVENTION

Generally, the present invention relates to a rubber composition containing EPDM (ethylene-propylene-diene terpolymer) rubber as its main component and an elastic roller made of the rubber composition. More particularly, the present invention relates to a rubber composition for use in a paper-feeding roller of an image-forming apparatus such as an electrostatic copying machine, a laser beam printer, a facsimile, and the like and an automatic deposit/payment machine (ATM) and an elastic roller made of the rubber composition.

DESCRIPTION OF THE RELATED ART

The rubber composition for use in the paper-feeding roller of the image-forming apparatus such as the electrostatic copying machine, the laser beam printer, the facsimile, and the like and the automatic deposit/payment machine is required to have a high coefficient of friction against paper and high degree of wear resistance so that it can withstand consecutive use.

Because ozone is generated in the image-forming apparatus such as the electrostatic copying machine, the laser beam printer, the facsimile, and the like using electrophotography, the rubber composition of the paper-feeding roller is exposed to the ozone. Thus, it is important that the rubber composition of the paper-feeding roller is resistant to the ozone to such an extent that it is not deteriorated thereby. In the image-forming apparatus using electrophotography, a deteriorated image is formed if a foreign substance attaches to the surface of a photosensitive material on which an electrostatic latent image is formed. Thus, it is also important that the rubber composition does not deposit the foreign substance on the surface of the photosensitive material.

As rubber compositions having such properties, EPDM rubber, urethane rubber, norsorex rubber, and the like are hitherto used singly or in the form of a mixture thereof. The EPDM rubber is used by preference because it is resistant to the ozone and inexpensive. In order to improve the paper-feeding performance and wear resistance of a rubber composition containing the EPDM rubber, the present applicant has taken various countermeasures. For example, as disclosed in Laid-Open Japanese Patent Publication No. 5-77508, the present applicant proposed the improvement of the friction coefficient of the rubber composition and wear resistance thereof by specifying the addition amount of softener for the EPDM rubber, Mooney viscosity of raw rubber of the EPDM rubber, and the addition amount of carbon black for the EPDM rubber.

In recent years, OA equipments (electrostatic copying machine, laser beam printer, and the like) are used personally, and maintenance-free and durable OA equipments are manufactured. Thus, it is necessary to make the life of the paper-feeding roller long. To this end, there is a growing demand for the development of a rubber composition capable of maintaining a preferable paper-feeding performance and wear resistance for a long time. But the above-described conventional rubber compositions are incapable of providing preferable results.

In order to improve the durability of the rubber composition, namely, to allow the paper-feeding performance and wear resistance thereof to be used for a long time, the present applicant proposed a method of improving the affinity of the EPDM rubber for silicate which is filler by adding the silicate and silane coupling agent to the EPDM rubber (Laid-Open Japanese Patent Publication No. 8-63388). The present applicant also proposed the use of oxidative condensate of aliphatic primary amine or aliphatic secondary amine and 2-mercaptobenzothiazole as sulfeneamide vulcanizing accelerator (Laid-Open Japanese Patent Publication No. 8-138795). These countermeasures are incapable of improving the durability of the rubber composition to a satisfactory level.

SUMMARY OF THE INVENTION

The present invention has been made in view of the situation. Thus, it is an object of the present invention to provide a rubber composition highly resistant to ozone and capable of maintaining a high friction coefficient and a superior wear resistance for a long time; and an elastic roller made of the rubber composition.

In order to solve the above-described problems, the present inventors have made researches on the paper-feeding mechanism of the elastic roller made of the rubber composition. As a result, they have found that a frictional force is generated mainly by an adhesive friction between the surface of the elastic roller and paper. They have also found that in order for the adhesive friction to occur efficiently, it is necessary to make the rubber composition soft and allow the elastic roller to contact the paper in a large area and that the soft rubber composition reduces the frequency of slippage between the elastic roller and the paper and improves the wear resistance of the elastic roller. But the elastic roller contacts the flat surface of the paper at its curved surface. Thus, slippage necessarily occurs at the downstream end of the contact region of the elastic roller in a paper-feeding direction. In a known paper feed method, in order to prevent upper and lower papers adjacent to each other from being simultaneously fed by the elastic roller, a pair of an upper roller and a lower roller are used to feed the upper paper separately from the lower paper. In this method, mechanical slippage occurs between the lower roller and the paper because a torque is always applied to the lower roller thereto in the direction opposite to the paper-feeding direction. Accordingly, to improve the durability of the elastic roller, it is necessary to allow the slip resistance thereof to be small in the slippage between the lower roller and the paper. That is, it is very important to reduce the dynamic frictional force of the elastic roller as much as possible. Based on the knowledge they acquired thus, they have made further researches to find that the dynamic frictional force of the elastic roller is greatly affected by hysteresis loss friction as well as the adhesive friction and can be reduced by decreasing the elastic hysteresis (decreasing loss tangent) of the rubber composition. This is the particulars of how the present invention has been made.

More specifically, in claim 1, there is provided a rubber composition containing EPDM rubber as its main component and having a hardness of 20–30 degrees in JIS A hardness and a loss tangent (tan δ) at 0.02–0.035 at 50° C.

The rubber composition having the characteristics is resistant to ozone and so deforms as to contact paper in a large area, thus having a high degree of an adhesive frictional force. Further, the rubber composition has a small energy loss when slippage occurs between it and the paper and in addition, a very small amount of wear.

If the JIS A hardness of the rubber composition is less than 20 degrees, it is so soft that its rigidity is insufficient and worn irregularly. On the other hand, if the JIS A hardness thereof is more than 30 degrees, it is difficult for the rubber composition to deform and consequently, the rubber composition is incapable of having a high degree of adhesive frictional force (gripping force) for the paper. Further, if the loss tangent (tan δ) of the rubber composition at 50° C. is less than 0.02, the rubber composition has hardly shock-absorbing performance and its follow-up performance for the paper degrades greatly, thus having a much deteriorated paper-feeding performance. On the other hand, if the loss tangent (tan δ) of the rubber composition at 50° C. is more than 0.035, it has a large energy loss when slippage occurs between it and the paper and the degree of resistance to slip is great, namely, dynamic coefficient of friction is great, thus having a large amount of wear.

In claim 2, there is provided an elastic roller which is formed by molding the rubber composition having the construction in the shape of a roller. The elastic roller contacts the paper in a large area, thus exhibiting a superior paper-feeding performance even in the presence of ozone. Further, the elastic roller is not worn easily and fast when slippage occurs between it and the paper, thus maintaining superior paper-feeding performance and wear resistance for a long time.

As the EPDM rubber which is used for the rubber composition of the present invention, oil-extended EPDM rubber and/or non-oil-extended EPDM rubber can be used. The diene component of the EPDM rubber is not limited to a specific one, but can be selected from ethylidene norbornene (ENB) and dicyclopentadiene (DCPD) and the like can be used.

It is necessary that the EPDM rubber (when oil-extended EPDM rubber is used, polymer content excluding oil content) is contained at 60 wt % or more in the rubber content of the rubber composition in order for the rubber composition to be resistant to ozone. It is favorable that the EPDM rubber is contained at 70–100 wt % in the rubber content of the rubber composition.

As rubbers other than the EPDM rubber which compose the rubber composition, the following rubbers are exemplified: natural rubber, ethylene-propylene rubber (EPM), styrene-butadiene rubber (SBR), butyl rubber (IIR), halogenated IIR, chloroprene rubber (CR), chlorosulfonated polyethylene rubber (CSM), copolymer rubber of epichlorohydrin and ethylene oxide (CIIC), homopolymer rubber of epichlorohydrin (CHR), hydride of nitrile rubber (NBR), chlorinated polyethylene, urethane rubber, and mixed rubber of silicone and ethylene propylene. These rubbers can be used singly or in combination of two or more thereof. To improve the strength of the rubber composition, natural rubber is preferably used.

The hardness of the rubber composition of the present invention is set to so low as to allow it to have 20–30 degrees in the JIS A hardness, as described above. The hardness of the rubber composition changes according to the molecular weight of the rubber thereof, the degree of crosslinking thereof or a vulcanizing condition applied in a vulcanizing process which will be described later. In order to allow the rubber composition to have a low hardness, it is preferable to add oil or plasticizer thereto. As the oil, mineral oil such as paraffinic oil, naphthenic oil, aromatic oil, and known synthetic oil consisting of hydrocarbon oligomer can be used. As the synthetic oil, oligomer of α-olefin, oligomer of butene, oligomer of ethylene and α-olefin. Amorphous oligomer of ethylene and α-olefin is favorable by preference. As the plasticizer, dioctyl phthalate (DOP), dibutyl phthalate (DBP), dioctyl sebacate (DOS), dioctyl adipate (DOA) can be used. Any one of these plasticizers is used at favorably 20–70 parts by weight and more favorably at 30–60 parts by weight per 100 parts by weight of the rubber component.

Any one of these oils is used at favorably 20–150 parts by weight per 100 parts by weight of the rubber of the rubber composition. When the oil-extended EPDM rubber is used as the rubber thereof, the oil is used at favorably 100–150 parts by weight per 100 parts by weight of the rubber to reduce the hardness thereof, because the oil-extended EPDM rubber commonly consists of a high molecular weight polymer which causes the hardness of the rubber composition to be increased. On the other hand, when the non-oil-extended EPDM rubber is used as the rubber of the rubber composition, the oil is used at favorably 20–70 parts by weight and more favorably at 30–60 parts by weight per 100 parts by weight of the rubber, because the non-oil-extended EPDM rubber commonly consists of a low molecular weight polymer.

In order to improve the strength of the rubber composition, in case of need filler may be added to the rubber composition. As the filler, powder such as silica, carbon black, clay, talc, calcium carbonate, dibasic phosphite (DLP), basic magnesium carbonate, alumina, and the like can be exemplified. It is preferable to use the filler at less than 10 wt % per the entire rubber composition because the addition of an excess amount thereof to the rubber composition makes the hardness of the rubber composition too high.

The rubber composition of the present invention is produced by vulcanizing a kneaded product thereof. Thus, vulcanizing agent and vulcanizing additive are added to the rubber in addition to the above-described oil, plasticizer, and filler.

As the vulcanizing agent, sulfur, sulfur-containing organic compounds such as N,N-dithiobismorpholine, and organic peroxides such as benzoyl peroxide can be used.

Normally, vulcanizing accelerator is used as the vulcanizing additive. The vulcanizing accelerator and vulcanization acceleration assistant are used in combination if necessary.

As the vulcanizing accelerator, inorganic accelerators such as calcium hydroxide, magnesia (MgO), and litharge (PbO) and organic accelerators shown below can be used. The organic accelerators include thiazole vulcanizing accelerators such as 2-mercaptobenzothiazole, N-cyclohexyl-2-benzothiazolesulfene: sulfeneamide vulcanizing accelerators such as oxidative condensates of the 2-mercaptobenzothiazole and aliphatic primary amine such as n-butylamine, tert-butylamine, propylamine, and the like; oxidative condensates of the 2-mercaptobenzothiazole and aliphatic secondary amine such as dicyclohexylamine, pyrrolidine, piperidine, and the like; oxidative condensates of alicyclic primary amine and the 2-mercaptobenzothiazole; oxidative condensates of morpholine compounds and the 2-mercaptobenzothiazole: thiuram vulcanizing accelerators such as tetramethylthiuram monosulfide (TMTM), tetramethylthiuram disulfide (TMTD), tetraethylthiuram dimonosulfide (TETD), tetrabutylthiuram dimonosulfide (TBTD), dipentamethylenethiuram tetrasulfide (DPTT), and the like: dithiocarbamate vulcanizing accelerators such as zinc dimethyldithiocarbamate (ZnMDC), zinc diethyldithiocarbamate (ZnEDC), zinc di-n-butylcarbamate (ZnBDC), and the like. These vulcanizing accelerators can be used singly or in the form of a mixture of two or more thereof. In particular, it is favorable to use at least one of the thiazole vulcanizing accelerator and the sulfeneamide vulcanizing accelerator in combination with at least one of the thiuram vulcanizing accelerator and the dithiocarbamate vulcanizing accelerator. It is more favorable to use all of the thiazole vulcanizing accelerator, the sulfeneamide vulcanizing accelerator, the thiuram vulcanizing accelerator, and the dithiocarbamate vulcanizing accelerator. This is because the use of at least one of the thiazole vulcanizing accelerator and the sulfonamide vulcanizing accelerator allows vulcanizing speed to be fast, and the use of at least one of the thiuram vulcanizing accelerator and the dithiocarbamate vulcanizing accelerator allows the start of vulcanization to be fast, thus allowing the vulcanization to be progressed efficiently.

As the vulcanization acceleration assistant, metallic compounds such as zinc white; and aliphatic acids such as stearic acid, oleic acid, cottonseed aliphatic acid, and the like can be used.

In order to reduce the slip resistance of the rubber composition when slippage occurs between it and paper, the loss tangent (tan δ) of the rubber composition at 50° C. is set to 0.02–0.035. To allow the above range to be achieved, it is preferable to add a comparatively small amount of the plasticizer and a large amount of the vulcanizing agent and the vulcanizing accelerator to the rubber composition. Thus, it is favorable to use 0.5–3 parts by weight of the vulcanizing agent per 100 parts by weight of the rubber. It is more favorable to use 1–2 parts by weight of the vulcanizing agent per 100 parts by weight of the rubber. It is favorable to use 2–5 parts by weight of the vulcanizing accelerator per 100 parts by weight of the rubber. It is more favorable to use 3–4 parts by weight of the vulcanizing accelerator per 100 parts by weight of the rubber. The vulcanization acceleration assistant is used at 3–6 parts by weight per 100 parts by weight of the rubber.

In addition to the above-described components, antioxidant or wax can be added to the rubber composition if necessary. The antioxidant includes imidazoles such as 2-mercaptobenzoimidazole; amines such as phenyl-α-naphthylamine, N,N'-di-β-naphthyl-p-phenylenediamine, N-phenyl-N'-isopropyl-p-phenylenediamine; and phenols such as di-tert-butyl-p-cresol, styrenated phenol, and the like.

The rubber composition of the present invention is produced by kneading a mixture of components such as the EPDM rubber, the oil, the plasticizer, the filler, the vulcanizing agent, the vulcanizing additive, and the like and then vulcanizing the kneaded product. The mixture is kneaded by known methods and apparatuses. For example, known rubber-kneading apparatuses such as an open roll or a Banbury mixer can be used to knead the mixture at 60–120° C. for 5–30 minutes.

The kneaded product can be also vulcanized by known methods. That is, the kneaded material is vulcanized at 150–180° C. for 5–30 minutes by an electric press machine or a vulcanizing can. Electron rays may be used to vulcanize the kneaded product.

Normally, the kneaded product is molded to form it into a desired shape before or when it is vulcanized. For example, in shaping it into a roller, the kneaded product is compression-molded by a roller-shaped die and then, the die is heated to vulcanize it. More specifically, as shown in FIG. 1, after the kneaded product is molded by a roller-shaped die, a shaft S is inserted into a roller-shaped molded material R, and then the shaft S is rotatably supported by a supporting member C. While the roller-shaped molded product R is being rotated at a predetermined speed on the shaft S, it is irradiated with electron rays having a predetermined absorbed doze emitted by an electron ray-irradiating device E to prevulcanize the surface of the roller-shaped molded material R. Then, the roller-shaped molded material R is put into a vulcanizing can to vulcanize the entire molded material R. Further, it is possible to vulcanize the kneaded material while it is being molded into a desired shape of, for example, a sheet, roller or the like by injection molding, transfer molding or extrusion molding.

FIG. 2 shows a state in which an elastic roller obtained by molding the rubber composition of the present invention is applied to a paper-feeding roller of an electrostatic copying machine. A shaft 2 is inserted into the center of a paper-feeding roller 1 confronting a pad 3. When the shaft 2 is rotated in a direction shown by an arrow, the paper-feeding roller 1 rotates in the same direction, thus rolling a sheet of paper 4 positioned near the paper-feeding roller 1 into the gap between it and the pad 3 and supplying the paper 4 to the inside of the copying machine.

FIG. 3 shows a state in which an elastic roller obtained by molding the rubber composition of the present invention is applied to paper-feeding roller (upper and lower rollers) of the electrostatic copying machine. The paper-feeding roller supplies paper to the inside of the electrostatic copying machine by separating an upper sheet of paper from a lower sheet of paper. A shaft 2 is inserted into the center of the lower roller 10a. A torque 11 is always applied to the lower roller 10a and the shaft 2 in the direction opposite to a paper-feeding direction. A shaft 2 is inserted into the center of the upper roller 10b. The upper roller 10b is rotated in a direction shown by an arrow A owing to the rotation of the shaft 2. When the upper roller 10b rotates in the direction shown by the arrow A, a sheet of paper 13 positioned uppermost on a sheaf 12 of paper is separated from a sheet of paper adjacent thereto because the torque 11 is applied to the lower roller 10a. Then, the paper 13 passes the gap between the upper roller 10b and the lower roller 10a and is supplied to the inside of the copying machine.

FIG. 4 shows a state in which the elastic roller is used as a paper-feeding roller of the electrostatic copying machine. Similarly to the above, a shaft 2 is inserted into the center of each of paper-feeding rollers 5a and 5b opposed to each other. When the shafts 2 are rotated in opposite direction, a sheet of paper 4 being fed to the paper-feeding rollers 5a and 5b is rolled into the gap therebetween and fed to the inside of the copying machine.

The elastic roller manufactured by molding the rubber composition of the present invention can be used as paper-feeding rollers of various types of apparatuses. In particular, the elastic roller can be preferably used as a paper supply roller, a paper-feeding roller, a paper discharge roller positioned in a tear part of a fixing device of an electrophotographic image-forming apparatus such as an electrostatic copying machine, a facsimile, a laser beam printer, and the like. This is because the elastic roller is resistant to ozone and hence deteriorated to a low degree by the ozone, thus maintaining constant paper-feeding performance for a long time.

DESCRIPTION OF THE PREFERRED EMBODIMENTS

Figure 1:
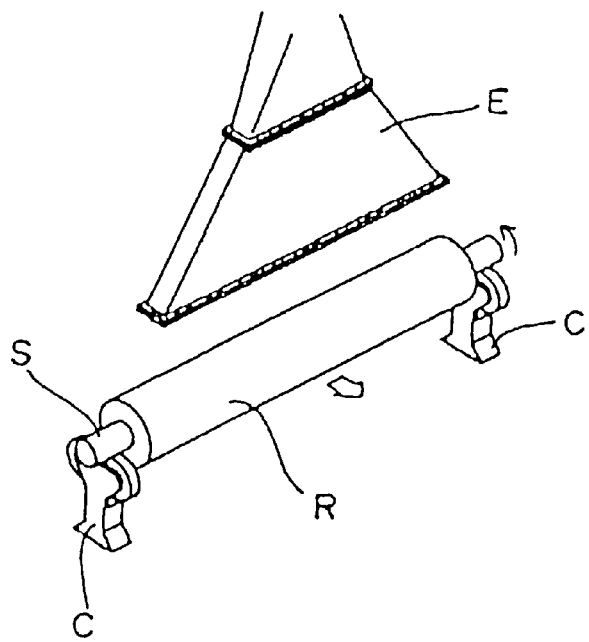
FIG. 1 is a perspective view showing an example of a vulcanizing process of a roller-shaped molded product made of the rubber composition of the present invention.
Figure 2:
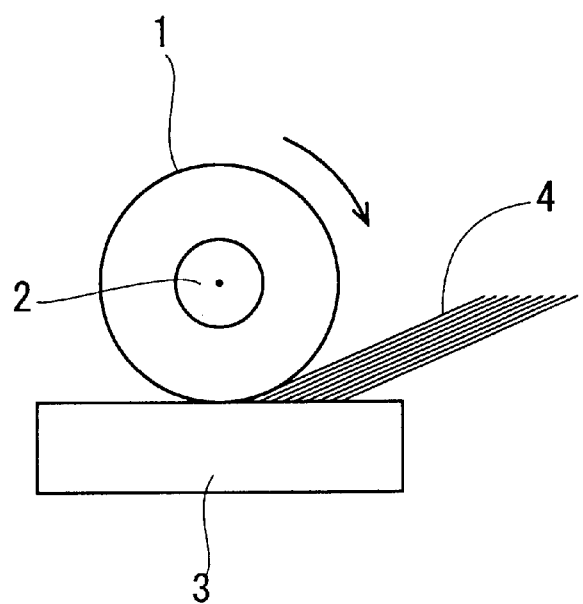
FIG. 2 shows an elastic roller made of the rubber composition of the present invention and used as a paper supply roller of an electrostatic copying machine.

The embodiment of the present invention will be described in detail by way of examples in comparison with comparative examples.

EXAMPLES 1–3 AND COMPARATIVE EXAMPLES 1–4

EPDM polymer (E505 (trade name) manufactured by Sumitomo Kagaku Co., Ltd.)
Natural rubber
Silica used as filler (NipsilVN3 (trade name) manufactured by Nippon Silica Co., Ltd.)
Paraffin oil (PW-90 ((trade name) manufactured by Idemitsu Kosan Co., Ltd.)
Stearic acid
Zinc oxide
Sulfur (manufactured by Tsurumi Kagaku Co., Ltd.)
Vulcanizing accelerator (1) (mercaptobenzothiazole, Noxceller-M (trade name) manufactured by Ouchishinko Kagaku Co., Ltd.)
Vulcanizing accelerator (2) (N-cyclohexyl-2-benzothiazole, Noxceller-CZ (trade name) manufactured by Ouchishinko Kagaku Co., Ltd.)
Vulcanizing accelerator (3) (tetraethylthiuram disulfide and Noxceller-TET (trade name) manufactured by Ouchishinko Kagaku Co., Ltd.)
Vulcanizing accelerator (4) (dibutyldithiocarbamine and Noxceller-BZ (trade name) manufactured by Ouchishinko Kagaku Co., Ltd.)

Using the above raw materials, a rubber composition of each of examples 1–3 and a rubber composition of each of comparative examples 1–4 were prepared according to the formulation shown in table 1. Respective rubber compositions were molded into roller-shaped moldings and vulcanized to prepare rubber rollers A–G.

Using a kneader (55L kneader), the materials were kneaded at 100° C. for 20 minutes to prepare the respective rubber compositions.

The kneaded raw materials were vulcanized for 30 minutes in the condition of 160° C. and a pressure of 50 kg/cm² to prepare the rubber rollers A–G each having an outer diameter of 20 mm, an inner diameter of 9 mm, and a width of 10 mm.

TABLE 1

| | E1 | C1 | E2 | E3 | C2 | C3 | C4 |
|---|---|---|---|---|---|---|---|
| EPDM | 60 | 100 | 100 | 100 | 100 | 100 | 100 |
| Natural rubber | 40 | — | — | — | — | — | — |
| Silica | 10 | — | 10 | 20 | 30 | 30 | 30 |
| Paraffin oil | 30 | — | 30 | 60 | 80 | 120 | 20 |
| Stearic acid | 1 | 1 | 1 | 1 | 1 | 1 | 1 |
| Zinc oxide | 5 | 5 | 5 | 5 | 1 | 5 | 5 |
| Sulfur | 2 | 3 | 2 | 2 | 5 | 1 | 2 |

TABLE 1-continued

| | E1 | C1 | E2 | E3 | C2 | C3 | C4 |
|---|---|---|---|---|---|---|---|
| Vulcanizing accelerator (1) | 1 | 1 | 1 | 1 | 2 | 1 | 1 |
| Vulcanizing accelerator (2) | — | 1 | — | — | 1 | — | 1 |
| Vulcanizing accelerator (3) | 0.5 | 0.5 | 0.5 | 0.5 | 0.5 | 0.5 | 0.5 |
| Vulcanizing accelerator (4) | 1 | 1 | 1 | 1 | 1 | 1 | 1 |
| Elastic roller | A | B | C | D | E | F | G |

The loss tangent (tan δ) of each of the prepared rubber rollers A–G and the hardness thereof were measured. Each rubber roller was used as a paper supply roller of a commercially available electrophotographic copying machine having a roller-removing mechanism to conduct paper-feeding test.

Measurement of Loss Tangent (tan δ)

Using a Viscoelastic Spectrometer manufactured by Iwamoto Seisakusho Co., Ltd., the loss tangent (tan δ) of each rubber composition (sample) was measured in the following viscoelastic measurement condition.

specimen: 4 mm in width, 30 mm in length, and 2 mm in thickness initial strain: 4 mm amplitude: 0.1 mm frequency: 0.1 mm temperature: 50° C.

Measurement of Hardness

The hardness of each sample was measured in accordance with the JIS A method.

Paper-Feeding Test

Figure 3:
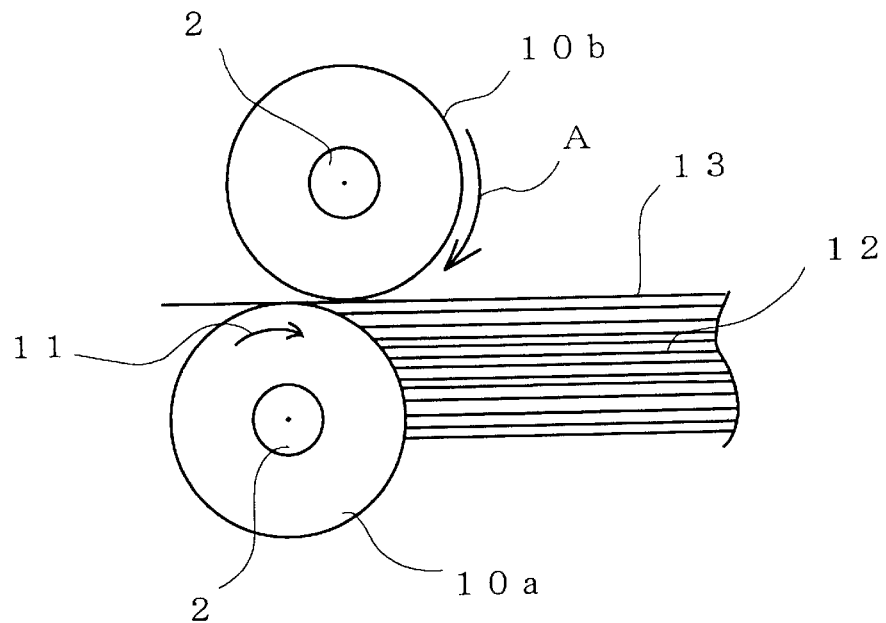
FIG. 3 shows an elastic roller made of the rubber composition of the present invention and used as a paper supply roller, of the electrostatic copying machine, which supplies paper by separating one paper from the other.
Figure 4:
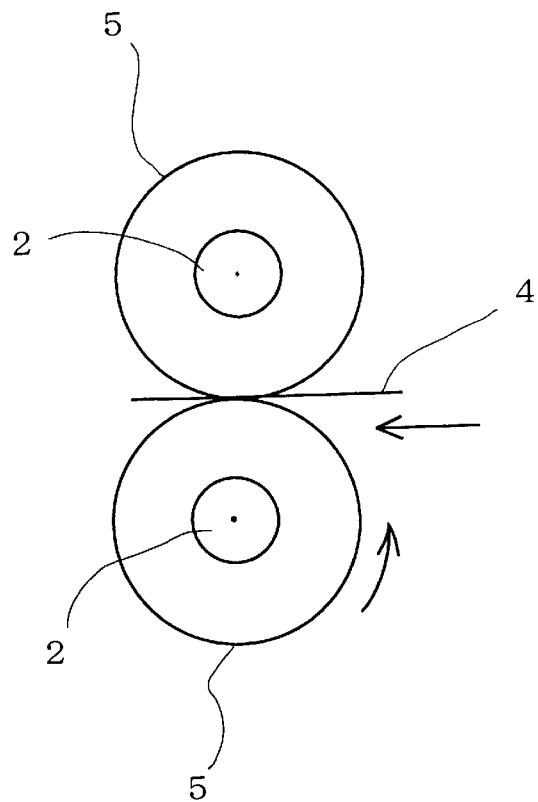
FIG. 4 shows an elastic roller made of the rubber composition of the present invention and used as a paper feeding roller of the electrostatic copying machine.

Using an electrophotographic copying machine (VIVACE (trade name) manufactured by Fuji Xerox Co., Ltd.), each rubber roller was used as a paper supply roller having a roller-removing mechanism (see FIG. 3). 15,000 sheets of paper (PPC paper) of size A4 for use in the electrophotographic copying machine were fed by each rubber roller by applying a load of 250 g to a shaft thereof for 7.5 hours in the condition of 22° C. and a humidity of 55%.

Measurement of Friction Coefficient

Figure 5:
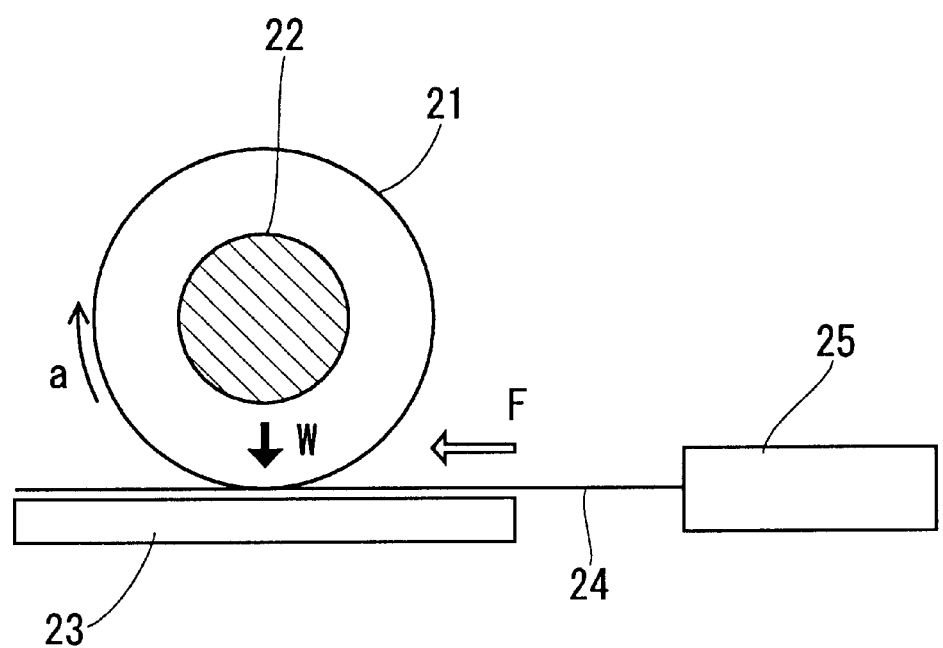
FIG. 5 is a schematic view showing a method of measuring the friction coefficient of a rubber roller.

As shown in FIG. 5, a load was applied to a rotation shaft 22 of a rubber roller 21 by sandwiching a PPC paper 24 of size A4 connected with a load cell 25 between the rubber roller 21 and a plate 23 to press (load W=250 g) the rubber roller 21 against the plate 23, as shown by a black arrow. Then, the rubber roller 21 was rotated at a speed of 300 mm/second in a direction shown by an arrow (a) of a solid line in the condition of 22° C. and a humidity of 55%. A force F (g) generated in a direction shown by a white arrow was measured by the load cell 25 before and after a predetermined number of papers was applied to the rubber rollers A–G. Using an equation shown below, friction coefficients $\mu$ were determined from the measured value F (g) and the load W (250 g). The friction coefficient * of each of the rubber rollers A–G was measured at an initial stage of the paper passing test, after feeding 5000 sheets, after fedding 10,000 sheets, and after feeding 15,000 sheets. The friction coefficient $\mu$ was measured on a lower rubber roller to which a torque was at all times applied in the direction opposite to the direction the paper-feeding direction.

$$\mu = F(g)/W(g)$$

Wear Resistance Test

The variation (wear amount) of the outer shape of each lower roller to which the torque was at all times applied in the direction opposite to the paper-feeding direction was measured before the paper was applied thereto and after 15,000 sheets were applied thereto.

Ozone Resistance Test

After the rubber rollers were left for 120 hours in the presence of ozone having a concentration of 100 pphm, the surface of each rubber roller was visually inspected to evaluate ozone resistance thereof by the following criterion:

○: preferable

×: unpreferable

Table 2 shows properties measured in the above-described manner and test result.

TABLE 2

| Elastic roller | A | B | C | D | E | F | G |
|---|---|---|---|---|---|---|---|
| Loss tangent (tanδ) | 0.021 | 0.016 | 0.027 | 0.032 | 0.040 | 0.045 | 0.031 |
| Hardness (JIS A) | 25 | 25 | 22 | 23 | 24 | 16 | 35 |
| Friction coefficient | | | | | | | |
| Initial | 2.1 | 1.7 | 2.2 | 2.1 | 2.1 | 2.0 | 1.6 |
| 5,000 sheets | 2.1 | 1.8 | 2.1 | 2.1 | 2.1 | 1.8 | 1.6 |
| 10,000 sheets | 2.2 | 1.5 | 2.1 | 2.0 | 1.9 | 1.9 | 1.5 |
| 15,000 sheets | 2.1 | 1.6 | 2.1. | 2.2 | 1.9 | 1.6 | 1.6 |
| Wear resistance (Wear quantity (mm)) | 0.09 | 0.15 | 0.10 | 0.10 | 0.32 | 0.42 | 0.16 |
| Ozone resistance | ○ | ○ | ○ | ○ | ○ | ○ | ○ |

As apparent from table 2, the rubber rollers A, C, and D of each of the examples 1–3 maintained high friction coefficients (more than 2.0) while 15,000 sheets of paper passed. Further, each of them had a high degree of wear resistance because after 15,000 sheets of paper passed therebetween, the wear amounts thereof were less than 0.1 mm. In addition, each of them had a preferable ozone resistance. The test result indicates that their performances are hardly deteriorated after 15,000 sheets of paper were applied thereto. That is, they are durable.

On the other hand, the rubber roller B (loss tangent is less than 0.02) of comparative example 1 had a low friction coefficient (1.5–1.8) because it had a low viscoelasticity and a poor shock-absorbing performance. Further, it had a great wear amount (0.15) and was incapable of stably feeding the paper.

The rubber roller E (loss tangent is greater than 0.03) of comparative example 2 had a high friction coefficient while 15,000 sheets of paper passed, thus having a favorable paper-feeding performance. But it had a great slip resistance and thus had a great wear amount (0.32 mm). Therefore, it was anticipated that the rubber roller E cannot be used for more than 15,000 sheets of paper.

The rubber roller F (hardness is smaller than 20 and loss tangent is greater than 0.03) of comparative example 3 had a low friction coefficient after 5,000 sheets of paper passed, thus having a friction coefficient of 1.6 after 15,000 sheets of paper were applied thereto. In addition, it had a great wear amount (0.42 mm). Accordingly, it could not be used for more than 15,000 sheets of paper.

The rubber roller G (hardness is greater than 30) of comparative example 4 had a low friction coefficient of 1.6 from the initial stage until 15,000 sheets of paper passed. Further, it had a great wear amount (0.16 mm) and hence was an inferior roller.

As apparent from the foregoing description, the rubber composition of the present invention contains EPDM rubber as its main component and has a hardness of 20–30 degrees in JIS A hardness and a loss tangent (tan δ) at 0.02–0.035 at 50° C. Thus, the rubber composition is resistant to ozone and contacts paper in a large area, thus having a high degree of an adhesive frictional force. Further, the rubber composition has a small energy loss when slippage occurs between it and the paper and in addition, a very small amount of wear.

The elastic roller of the present invention which is formed by molding the rubber composition in the shape of a roller contacts the paper in a large area, thus exhibiting a superior paper-feeding performance even in the presence of ozone. Further, the elastic roller is not worn easily and fast when slippage occurs between it and the paper, thus maintaining high paper-feeding performance and wear resistance for a long time.

What is claimed is:

1. A rubber composition containing EPDM rubber as a main component thereof and having a hardness of 20–30 degrees in JIS A hardness and a loss tangent (tan δ) at 0.02–0.035 at 50° C.

2. An elastic roller which is formed by molding said rubber composition, according to claim 1, in the shape of a roller.

3. An elastic roller according to claim 2, which is used as a paper-feeding roller of an image-forming apparatus using electrophotography.

4. An elastic roller according to claim 3, wherein said paper-feeding roller consists of a pair of an upper roller and a lower roller and feeds sheets of paper by separating a sheet of paper positioned uppermost on a sheaf of paper from a sheet of paper adjacent, with said upper roller rotating in a paper-feeding direction and with a torque always being applied to said lower roller in a direction opposite to said paper-feeding direction.

5. An elastic roller according to claim 2, wherein said rubber composition is formed by vulcanizing a mixture of 100 parts by weight of a rubber component, 0.5–3 parts by weight of a vulcanizing agent, and 2–5 parts by weight of a vulcanizing accelerator.

6. An elastic roller according to claim 3, wherein said rubber composition is formed by vulcanizing a mixture of 100 parts by weight of a rubber component, 0.5–3 parts by weight of vulcanizing agent, and 2–5 parts by weight of a vulcanizing accelerator.

7. An elastic roller according to claim 4, wherein said rubber composition is formed by vulcanizing a mixture of 100 parts by weight of a rubber component, 0.5–3 parts by weight of vulcanizing agent, and 2–5 parts by weight of a vulcanizing accelerator.

8. An elastic roller according to claim 2, wherein said rubber composition contains natural rubber in a rubber component thereof.

9. An elastic roller according to claim 3, wherein said rubber composition contains natural rubber in a rubber component thereof.

10. An elastic roller according to claim 4, wherein said rubber composition contains natural rubber in a rubber component thereof.

* * * * *